Figure 3:
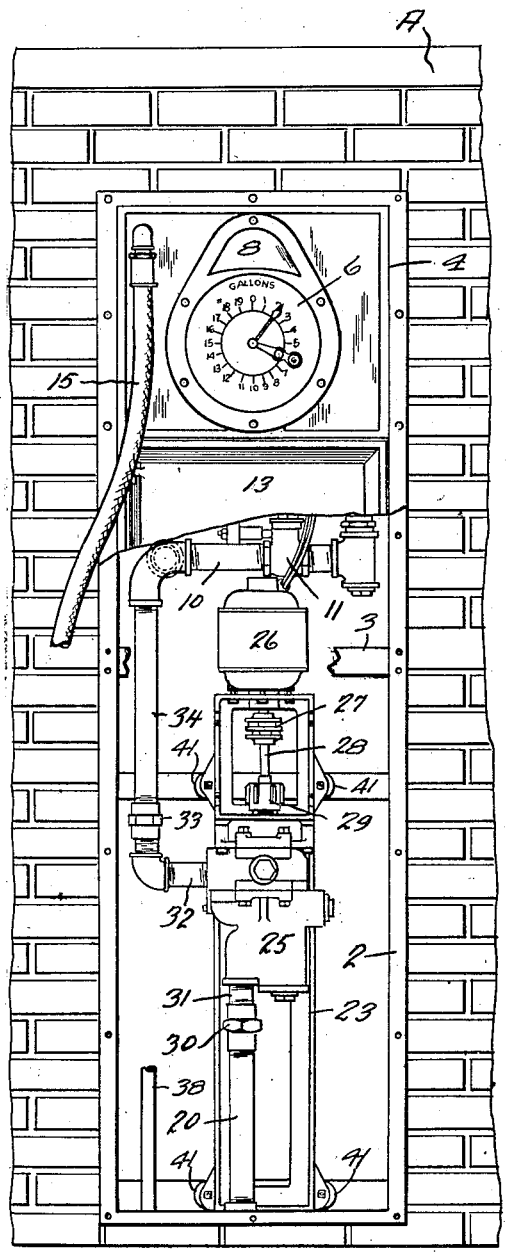

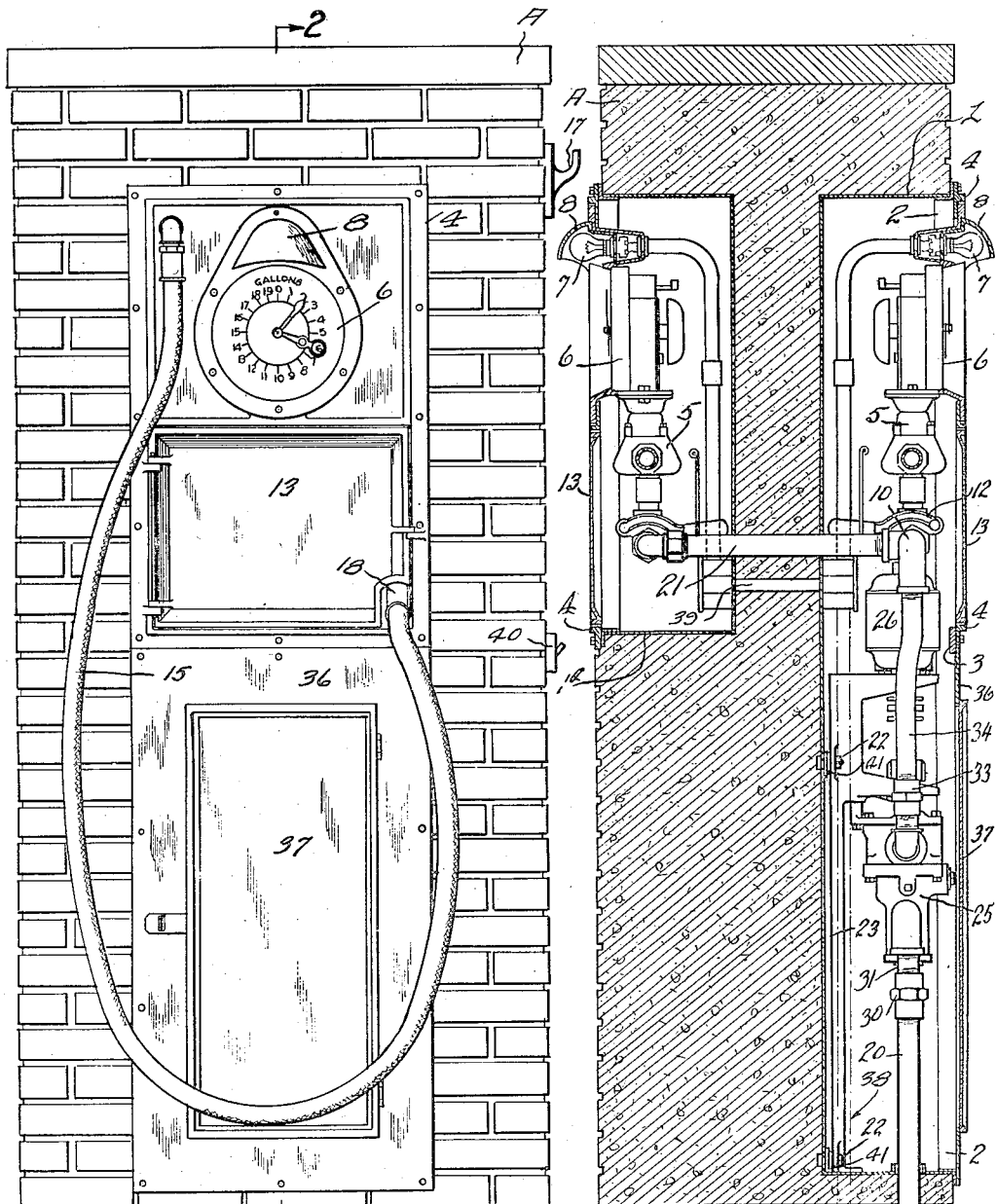

Jan. 10, 1933.　　W. E. MILESTONE　　1,893,843
LIQUID DISPENSING APPARATUS
Filed June 10, 1930　　2 Sheets-Sheet 2

INVENTOR
Walter E. Milestone
BY Hull, Brock & West
ATTORNEYS.

Patented Jan. 10, 1933

1,893,843

UNITED STATES PATENT OFFICE

WALTER E. MILESTONE, OF LAKEWOOD, OHIO

LIQUID DISPENSING APPARATUS

Application filed June 10, 1930. Serial No. 460,255.

This invention relates to that class of liquid dispensing apparatus used in or about gasolene stations, garages and like places for delivering gasolene in measured quantities directly to the fuel tanks of vehicles.

The primary purpose of the invention is the provision of a compact, self-contained power unit for pumping, measuring and dispensing liquid, and that is especially designed to be built into masonry structures, such as the brick, tile or concrete walls of gasolene stations or garages or the piers, columns or pillars, constructed of like material, that are common about such places.

Other objects are to provide a unit of the above character that may be completely assembled in the factory and tested to make sure that it is in perfect working order and then taken to the place where it is to be used and installed in the masonry structure preferably while the latter is in the process of construction with the minimum amount of trouble and expense.

The unit comprises generally, an open front casing that is desirably constructed of heavy sheet metal with an angle iron frame about its open front; a face plate carrying a metering and delivery outfit complete that is adapted to be bolted or otherwise secured to the upper part of said frame; a pumping apparatus—comprising a pump, a motor for operating it, and a substantial frame rigidly supporting both in proper alignment—that occupies the bottom portion of the casing, and a door and its frame for closing the front of said portion.

In making the installation, the casing is first placed within the wall with the gasolene supply line entering through a hole in the bottom, and with the electrical conduits or conductors admitted through openings provided for the purpose. The face plate with the metering and delivery outfit thereon is next secured in place, and then the supporting frame with the pump and motor mounted on it, is emplaced within the casing and the inlet and outlet of the pump connected by unions to the gasolene supply line and the inlet of the meter, respectively. The electrical connections are made at a convenient time during the installation and the door frame and door that close the bottom portion of the casing are finally secured in place. This completes the installation so far as the power unit is concerned.

The invention, however, has provision for using a remote measuring and delivery unit with the pumping apparatus of the above assembly, as will be pointed out in the course of the following description.

Further and more general objects of the invention are the provision of a power unit for pumping, measuring and dispensing liquid that is highly efficient, yet comparatively simple of construction and economical of manufacture; that is very reliable, and is particularly convenient of use.

Figure 4:
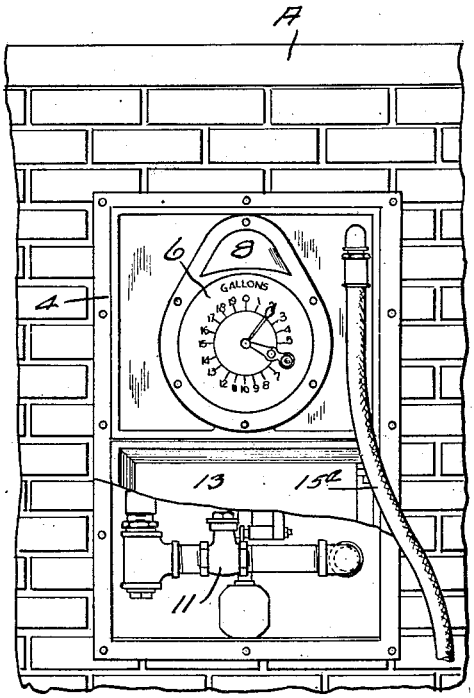
Figure 5:
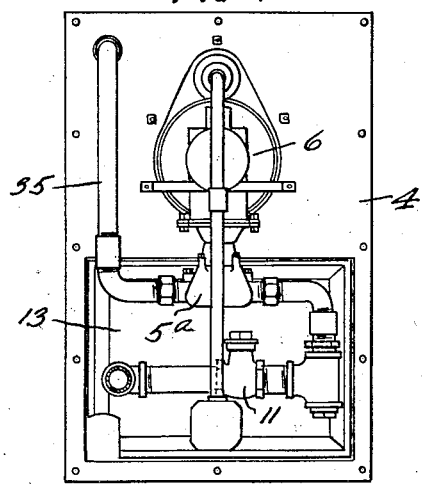

The foregoing objects, with others hereinafter appearing, are attained in the embodiment of the invention illustrated in the accompanying drawings wherein Fig. 1 is an elevational view of a masonry pier showing the unit emplaced therein; Fig. 2 is a vertical section through the pier, substantially on the line 2—2 of Fig. 1, this view revealing a remote liquid measuring and delivery unit that occupies a position in the opposite side of the pier from that shown in Fig. 1; Fig. 3 is a view, similar to Fig. 1, wherein the lower portion of the face plate is broken away and the bottom door and its frame are omitted to disclose the parts housed within the casing; Fig. 4 is a front elevational view of the remote measuring and delivery unit with the lower portion of the face plate broken away, and Fig. 5 is a rear view of the face plate removed from the casing and showing the meter and its associated parts mounted thereon.

Although my invention is adapted to be used, as hereinbefore stated, in conjunction with various kinds of masonry structures, I have, for the purpose of the present disclosure, represented the structure, which is designated A, as a pier of the sort used about gasolene stations. Such piers are commonly placed between sections of a drive so that two vehicles may be driven on opposite sides thereof and serviced at the same time, and to accomplish this purpose with my invention it is only necessary to associate with the power unit that is located on one side of the pier, a remote measuring and delivery unit located on the other side and supplied with gasolene from the pumping apparatus of the former unit.

The working parts of the power unit, with the piping and electrical connections thereof, are housed within a relatively heavy sheet metal casing 1 that has an open front surrounded by a substantial angle iron frame 2 whose side members, at about their middle portions, are connected by a cross member 3. A face plate 4 is bolted or otherwise secured to said cross member 3 and to the portion of the angle frame thereabove. A meter 5 is fastened to the inner side of the face plate 4 and the dial 6 of the meter is exposed to view through an opening in said plate, and above said opening is sustained an electric lamp 7 for illuminating the dial 6 at night. The lamp 7 is concealed and protected by a hood 8. The inlet of the meter is designated 10 and the same is controlled by a valve 11 having an operating handle 12 to which access is gained through an opening in the face plate 4 that is normally closed by a door 13.

The outlet side of the meter has communicative connection with a dispensing hose 15, as will presently appear. The discharge end of the hose is equipped with the usual valve control nozzle and, during business hours, the nozzle may be suspended from a hook 17 on the side of the pier, but when the station is closed the nozzle is preferably locked inside the door 13, the door having a notch 18 to accommodate the same.

When the masonry structure is built, a gasolene supply line 20 is brought upwardly through the bottom of the cavity occupied by the casing 1 and said cavity, and the one occupied by the remote unit whose casing is designated 1ª, are connected by a cross pipe 21. Mounted, and preferably removably secured, as by fastening means 22, within the lower portion of the casing 1 is a frame 23 that rigidly supports a pump 25, and an electric motor 26 for operating the same. The motor shaft is connected by a coupling 27 to the shaft 28 of the pump, and where the latter shaft rises from the pump casing it is equipped with the usual stuffing box 29. The supply pipe 20 is detachably connected, by a union 30, with the inlet 31 of the pump; and the outlet 32 of the pump is similarly connected, by a union 33, with the pipe 34 that leads to the inlet 10 of the meter 5. Branching off from the upper end of the pipe 34 is the previously mentioned cross pipe 21 which leads to the remote unit. The parts of the latter unit which correspond to those of the power unit are designated by like reference numerals, augmented by the exponent a, and here it may be explained that the outlet of the meter 5ª, as shown in Fig. 5, is connected, through a pipe 35, with the dispensing hose 15ª. Identical connections are made between the meter 5 of the power unit and the dispensing hose 15.

The lower portion of the casing 1 is closed at the front by a frame 36, and a door 37 that is hinged thereto, said frame being connected about its edges to the angle frame 2 and cross member 3. Access to the pump and motor for the purposes of inspection and making minor adjustments may be had at any time by simply opening the door 37; and if these parts require such attention as cannot conveniently be given while the parts are mounted within the casing, they may readily be removed by disconnecting the two unions 30 and 33 and unloosening the fastening means 22 of the frame 23. This enables the entire assembly to be lifted from the casing, the door frame 36 being removed to facilitate the work, if desired. In order to avoid the loss of time and inconvenience occasioned by the units being out of commission for an appreciable length of time, a properly conditioned pump and motor, mounted upon a supporting frame, may be substituted for the parts removed for repair.

The supply of current to the electric motor 26 is controlled by a switch 40 that is conveniently located on the side of the pier A.

The conduit through which the electric wires are led into the casing 1 is preferably brought up through the bottom of the casing, the same as the gasolene supply pipe 20. Such an arrangement is suggested in Figs. 2 and 3, in the former of which the conduit is shown in dot-and-dash lines. This conduit is designated 38 in the drawings. The electrical conduit systems of the two units are connected by a cross conduit 39.

To promote quietness of operation, the frame 23 that supports the motor and pump is caused to rest squarely upon the bottom of the casing 1 which, in turn, bears upon the underlying solid bed of masonry, thereby to reduce vibration to the minimum; and said frame is spaced from the back wall of the casing by cushion means 41, such as rubber, leather or felt washers, so as to prevent the slight vibration which is set up in the frame from being transmitted to the back wall of the casing which would act to amplify the noise created thereby.

The pump 25 is of the well known type in which there is a by-pass controlled by a valve that opens under pressure, and through which by-pass liquid, in excess of that permitted to escape through the outlet of the pump, circulates. The capacity of the pump is sufficient to supply liquid to a plurality of metering and delivery means.

Having thus described my invention, what I claim is:

1. A liquid dispensing apparatus for use in an encasing structure, the same being in the nature of a self-contained unit and comprising an open front casing that is adapted to be contained within the structure with its front exposed through a surface thereof, liquid metering and delivery means within the casing, an assembly consisting of a pump, a motor for operating the same, and a frame supporting the pump and motor in proper relation to each other, said assembly being mounted within the casing and bodily removable therefrom as a unit, separable communicative connections between the pump and meter, and a closure for the open front of the casing.

2. A liquid dispensing apparatus for use in an encasing structure, the same being in the nature of a self-contained unit and comprising an open front sheet metal casing, an angle frame surrounding the open front of the casing, the casing being adapted to be contained within the structure with the front portion of said angle frame exposed through a surface thereof, a member for application to the angle frame for closing the upper portion of the casing, liquid metering and delivery means carried by the member within the casing, an assembly consisting of a pump, a motor for operating the same, and a frame supporting the pump and motor in proper relation to each other and that is mounted within the lower portion of the casing, said assembly having separable communicative connection with the metering and delivery means and being bodily removable as a unit, a door frame detachably secured to the angle frame and occupying the entire area thereof below the aforesaid member, and a door carried by said frame.

3. In combination with an encasing structure, an open front casing contained within the structure and having its front exposed through a surface thereof, a second open front casing contained within the structure with its front exposed through the opposite surface thereof, the latter casing being of less vertical extent than the first mentioned casing and being opposite the upper portion thereof, a liquid metering and delivery means within the uper portion of the first mentioned casing, like means within the second mentioned casing, liquid pumping mechanism within the lower portion of the first mentioned casing and having communication with both liquid metering and delivery means, closures for the upper portion of the open front of the first mentioned casing and for the open front of the second mentioned casing having openings through which the indicators of the metering means are visible, and a closure for the lower portion of the first mentioned casing.

4. In combination with an encasing structure, an open front casing contained within the structure and having its front exposed through a face thereof, a second open front casing contained within the structure with its front exposed through another face thereof, a liquid metering and delivery means within each of said casings, liquid pumping mechanism within one of the casings, and communicative connections between said pumping mechanism and both liquid metering and delivery means.

In testimony whereof, I hereunto affix my signature.

WALTER E. MILESTONE.